United States Patent [19]

Hozumi

[11] Patent Number: 5,150,863

[45] Date of Patent: Sep. 29, 1992

[54] LAVATORY UNIT FOR A PASSENGER AIRPLANE

[75] Inventor: Hiroyuki Hozumi, Mitaka, Japan

[73] Assignee: Jamco Corporation, Tokyo, Japan

[21] Appl. No.: 731,238

[22] Filed: Jul. 17, 1991

[30] Foreign Application Priority Data

Aug. 22, 1990 [JP] Japan .................. 2-220409

[51] Int. Cl.⁵ ............................. B64D 11/00
[52] U.S. Cl. .................. 244/118.5; 244/129.5; 49/40
[58] Field of Search ............ 244/118.5, 129.4, 129.5; 49/40, 394, 400; 105/343

[56] References Cited

U.S. PATENT DOCUMENTS

| | | | |
|---|---|---|---|
| 4,537,440 | 12/1985 | Adams | 244/129.4 |
| 4,645,145 | 2/1987 | Alie | 244/118.5 |
| 4,884,767 | 12/1989 | Shibata | 244/118.5 |
| 5,014,934 | 5/1991 | McClaflin | 244/129.4 X |

*Primary Examiner*—Joseph F. Peters, Jr.
*Assistant Examiner*—Christopher P. Ellis
*Attorney, Agent, or Firm*—Armstrong, Nikaido, Marmelstein, Kubovcik & Murray

[57] ABSTRACT

A door for an amenity receiving section of a lavatory unit for a passenger airplane formed from honey-comb panels the door having a narrow width length plate and a structure wherein one side edge lengthwise thereof is curved, and a straight rigid rod is secured adjacent to the curved side edge lengthwise of the door and having a spring action for pressing a curved convex portion of the door to exert a spring force on the inside of the receiving section.

8 Claims, 4 Drawing Sheets

FIG. 7
FIG. 8
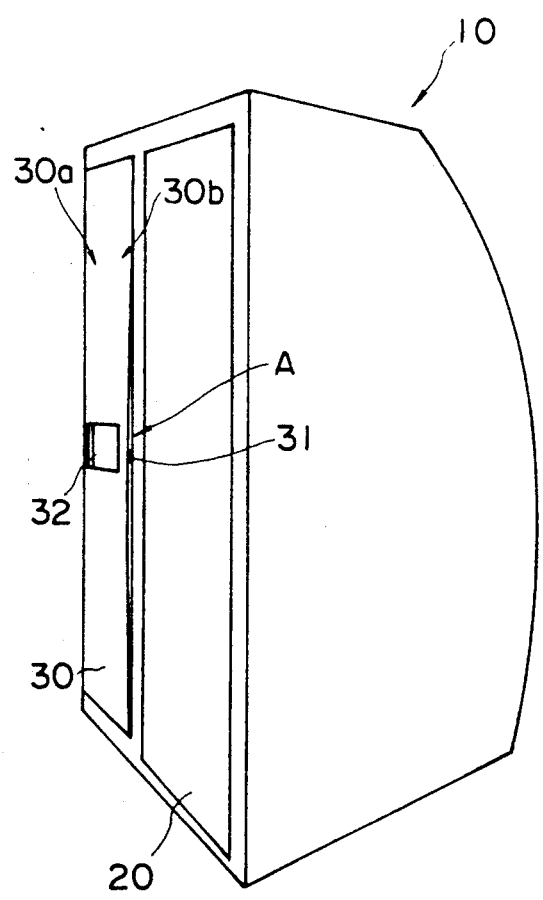
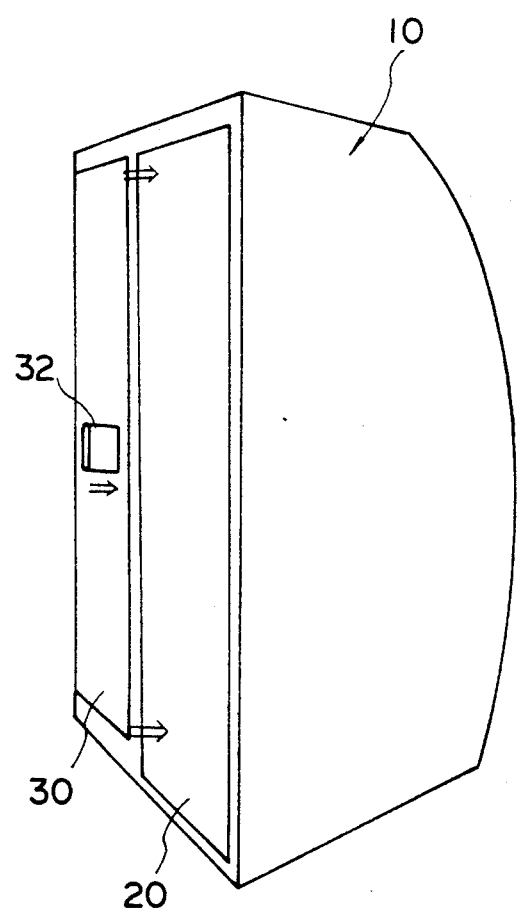

LAVATORY UNIT FOR A PASSENGER AIRPLANE

FIELD OF THE INVENTION

The present invention relates to a lavatory unit loaded on a passenger airplane, and particularly to an improvement in a door for receiving amenities.

DESCRIPTION OF THE PRIOR ART

The lavatory unit loaded on a passenger airplane has a box-like contour corresponding to a space of the body portion of a passenger airplane in which the unit is installed, and the unit being formed from honey-comb panels.

The lavatory unit is interiorly equipped with a lavatory space in which a toilet, a washstand, a mirror, and apparatus, such as, an illumination device, are installed, and an amenity receiving section for receiving so-called amenities such as linen, paper cups, sanitaries, containers for vomit and excreta, paper towels, etc. as consumers goods used within the lavatory, and the like.

The present applicant has proposed a lavatory unit for a passenger airplane provided with an amenity receiving section which can be operated externally of the lavatory unit for the purpose of improving the operating property, as granted as the U.S. Pat. No. 4,884,767.

On the front surface of the lavatory unit disclosed in the U.S. Pat. No. 4,884,767 are disposed a doorway for a user of the lavatory and a door for the amenity receiving section.

The door access to the amenity receiving section is locked by a single latch provided in the middle portion in a longitudinal direction in terms of operating property. However, the door for the amenity receiving section is formed from panels which are vertically long and narrow, and as thin as possible so as to be light-weight. Therefore, there is posed an inconvenience that even if the central portion is locked by the latch, the upper and lower ends are curved outwardly to form a gap or the like.

In view of the foregoing, it has been necessary to provide three latches on the upper portion, central portion and lower portion of the door for the amenities to close the door due to the necessity for completely closing the door for the amenity receiving section.

However, work for replenishment and replacement of amenities at an airport of call is so restricted that such work must be completed within a short period of time during getting on and off of passengers. It is cumbersome work for operators to positively open and reclose three latches in the amenity receiving section in such a short period of time.

SUMMARY OF THE INVENTION

Therefore, this invention provides a lavatory for a passenger airplane having a door for an amenity receiving section in which the door for the amenity receiving section is warped in advance to thereby apply a spring action to the door, and the closed state can be positively maintained for a long period of time by means of a single latch.

For achieving the aforesaid object, the lavatory unit according to the present invention has a unit space formed by being surrounded by wall surfaces, and an opening access to the lavatory and an opening for the amenity receiving section are opened to the front wall of the lavatory unit.

A doorway is disposed on the opening access to the lavatory and latched to thereby close a lavatory space. A door for the amenity receiving section is disposed on the opening for the amenity receiving section, and the central portion is latched to thereby close the space for the amenity receiving section. The door for the receiving section comprises a latch secured to the inner wall surface on the open side of the door and a rigid rod formed from a steel plate disposed on the inner wall surface of the door parallel to the side edge on the open side of the door, the rigid rod being secured to the inner wall surface of a curved concave surface in which a door plate is curved in a longitudinal direction.

In the thus configured lavatory unit according to the present invention, the lavatory space is closed by the doorway, and the space for the amenity receiving section is closed by the door for the receiving section. The door for the amenity receiving section is curved in the state where the inner wall surface on the open side in the central portion is pulled by the rigid rod. This curved central portion is latched whereby the urging force toward the inside of the receiving portion acts on the upper and lower ends of the door.

BRIEF DESCRIPTION OF THE DRAWINGS

FIG. 7 is a perspective view of a lavatory unit in the case where the door for the amenity receiving section is unlatched; and FIG. 8 is a perspective view of a lavatory unit in the case where the door for the amenity receiving section is latched.

DETAILED DESCRIPTION OF THE PREFERRED EMBODIMENTS

Embodiments of the present invention will now be described in detail with reference to the accompanying drawings.

Figure 1:
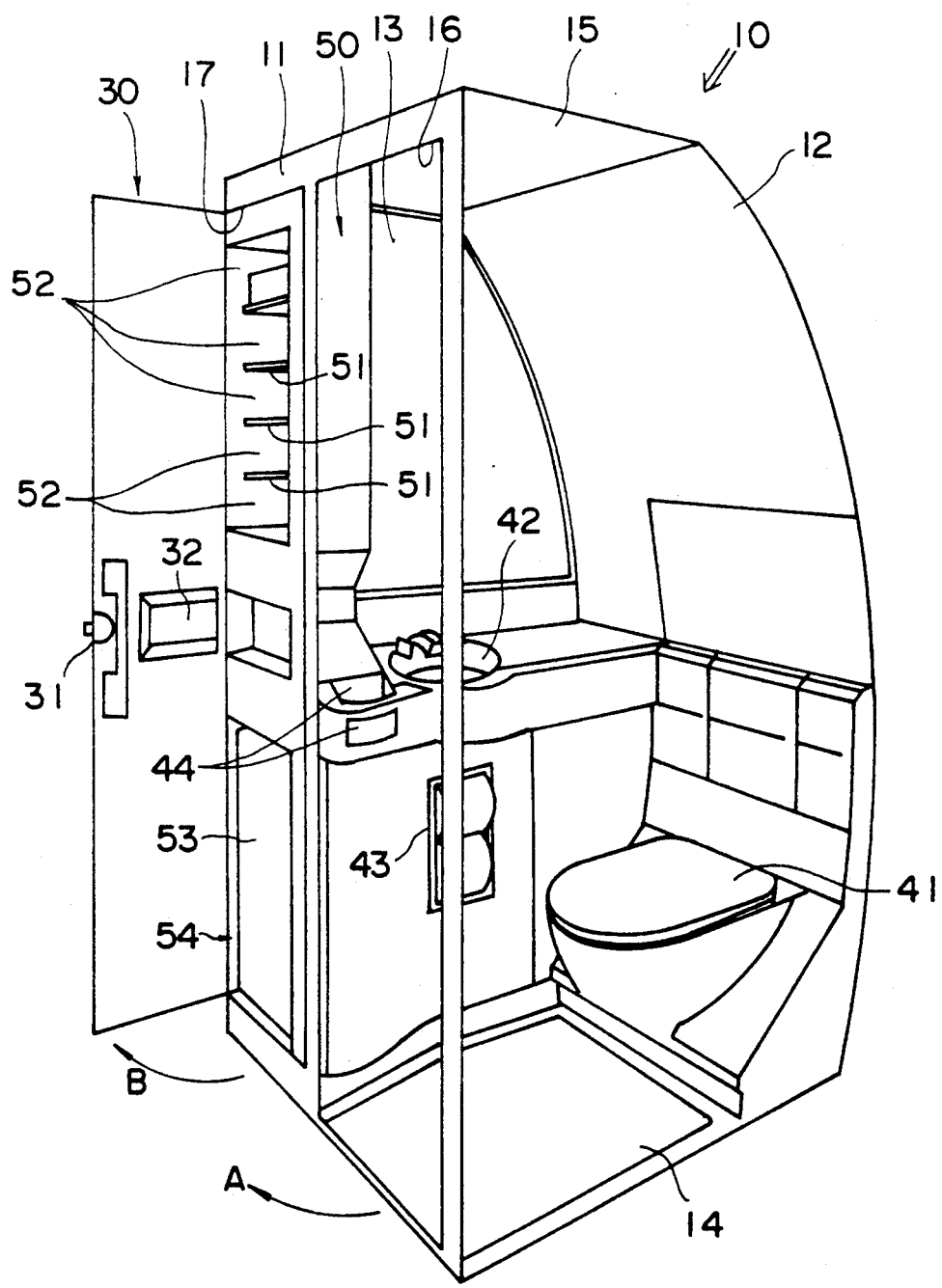
FIG. 1 is a perspective view showing a side wall of a lavatory unit according to the present invention and a doorway of the lavatory.

FIG. 1 is an overall perspective view showing a doorway and one side of a lavatory unit according to the present invention.

A lavatory unit 10 comprises a front wall 11 facing to a passage of a passenger airplane, a rear wall 12 opposed to the front wall, and left and right side walls 13 for connecting the front wall 11 and the rear wall 12. The front wall 11 has a substantially rectangular shape, and the rear wall 12 has a shape corresponding to an installed space of the passenger airplane. These walls are connected by a floor plate 14 and a ceiling plated 15 to form a box-like body.

The front wall 11 of the lavatory unit is formed on one side thereof with an opening 16 for entrance and exit of a lavatory user, and a door 20, FIGS. 7 and 8, for closing the opening 16 is pivotally supported at one side edge on the front wall so as to be opened and closed in a direction as indicated at arrow A, FIG. 1. An opening 17 for the amenity receiving section is aligned with the door for the lavatory user on the front wall 11. A door 30 for closing the opening 17 is pivotally supported at one side edge on the front wall 11 to be opened and closed in a direction as indicated at arrow B.

Internally of the unit of the opening 17 for the amenity receiving section is disposed a box-like receiving sections 50 which forms a vertically long and narrow receiving space, the opening 17 for the receiving section being opened on the side of the front wall 11. The internal space of the lavatory unit 10 is defined into a lavatory space surrounded by the doorway 20, the both side walls 13 and the rear wall 12, and a receiving space for the box-like receiving section 50 which is opened toward the outside of the lavatory unit when the door for the receiving section 30 is opened.

The receiving space of the receiving section 50 is formed, for example, at the upper part, with plural stages of shelf-like receiving portions 52 divided by a plurality of horizontal plates 51. The lower portion of the receiving space is partitioned so as to form a waste container or the like.

Within the lavatory space, a toilet 41 is arranged on the unit floor 14, a washstand 42 is provided on the side portion and a toilet roll fixture 43 is provided on the front plate portion of the washstand 42. Further, a mirror, an illumination device and the like are provided on the most effective wall surface.

Waste charging inlets 44 are provided at suitable locations corresponding to the container receiving portion 54 of the box-like receiving section 50 projected within the lavatory space so that the amenities used by the lavatory user are charged through the inlet 44 thereby they are disposed into the waste receiving container 53 of the receiving container section 54.

The lavatory unit 10 is formed of honeycomb panels which will be described later.

The doorway 20 to the lavatory space is mounted at one side edge to the side edge of the opening 16 of the front wall 11 by means of a long hinge so that it can be spread opened in a direction as indicated at arrow A which is on the passage side. A latch is provided at a substantially central position lengthwise of the side edge on the open side which is the side edge corresponding to the mounting side of the doorway 20. A catch is mounted on the side edge of the opening 16 of the front wall 11 corresponding to the latch. When the doorway 20 closes the opening 16, the latch on the door side and the catch on the front wall 11 side become fitted together, and the doorway 20 closes the lavatory space.

Figure 2:
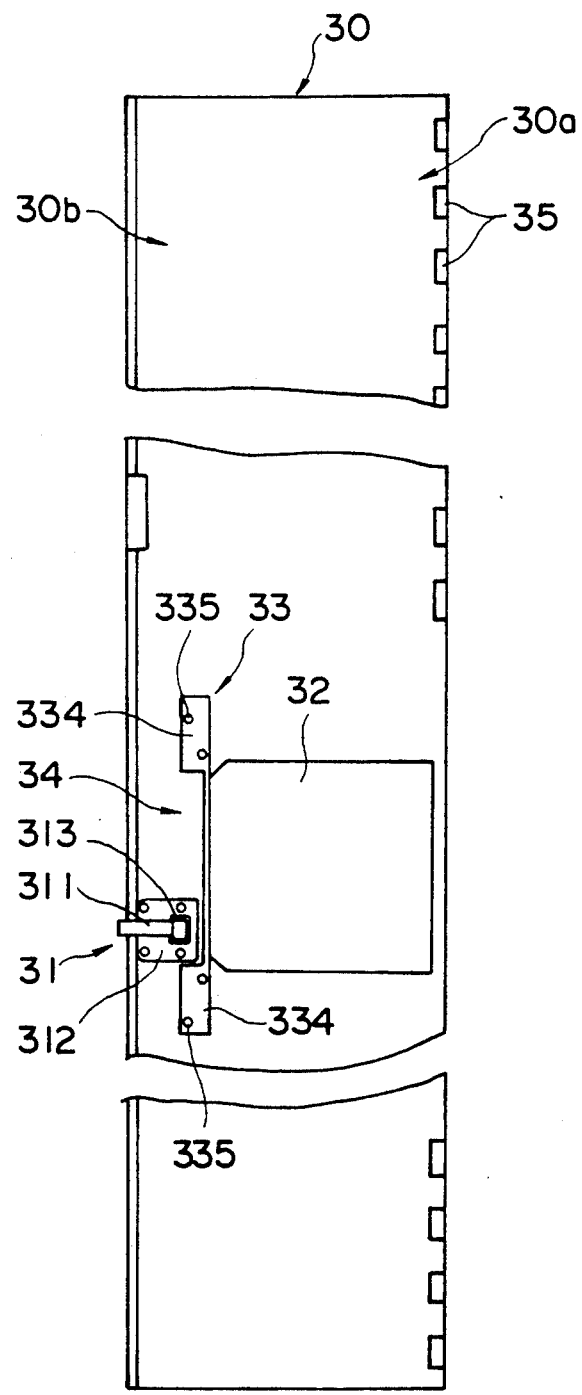
FIG. 2 is a plan view of a door for an amenity receiving section.

The door for the receiving section 30 mounted on the opening 17 for the amenity receiving section will be described with reference to FIG. 2. The door for the receiving section 30 is hinged at one side edge in a longitudinal direction to the side edge of the opening 17 of the front wall 11 by means of a lengthy hinge 35. Then, the door for the receiving section 30 can be spread opened in a direction as indicated at arrow B on the passage side. In the door for the receiving section 30, the hinged side edge serves as the mounting side 30a, and the opening side of the other side edge serves as the open side 30b. The lengthwise central portion of the mounting side 30a of the door 30 is bored with a rectangular operating opening 32 for operating the latch. The operating opening 32 has the size into which an operator can insert his hand to do work. The opened side 30b of the door for the receiving section 30 is formed in the lengthwise central portion with a narrow width portion 34 formed by narrowing the door body.

A latch 31 is mounted on the inner wall surface of the narrow width portion 34 and on the side edge portion on the open side 30b.

the latch 31 used in the present invention employs a conventionally known latch construction. That is, the latch 31 is designed so that an engaging rod 311 is inserted into a guide groove of a mounting plate 312 so that the former may be slidably moved in a horizontal direction, and a knob 313 is connected to the end of the engaging rod 311. As for the latch 31, when the engaging rod 311 is slidably moved by holding the knob 313, the end of the engaging rod 311 is moved in and out of the side edge on the open side of the door 30.

Figure 3:
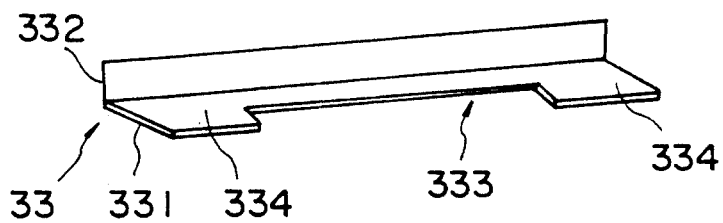
FIG. 3 is a perspective view of a rigid rod.

A rigid rod 33 is disposed, along the side edge of the operating opening 32, on the inner wall surface of the narrow width portion 34 in a gap between the latch 31 and the operating opening 32. As shown in FIG. 3, the rigid rod 33 comprises a horizontal plate 331 and a vertical plate 332 upright on the horizontal plate 331. This is a length rigid plate having an L-shape in section. While in this embodiment, the central portion of the horizontal plate 331 is cut, so as avoid an interference with the mounting portion of the latch 31, to form a recess portion 333, it is to be noted that if the latch mounting plate 312 is not in interference with the rigid rod 33, the horizontal plate 331 need not be provided with the recess portion 333. Both ends of the horizontal plate 331 of the rigid rod 33 comprise fixing portions 334 to the door wall surface. The rigid rod 33 is adherred to the inner wall surface of the door for the receiving section 30 by means of adhesives, and the fixing portions 334 are secured to the door 30 by the stops 335.

Figure 5:
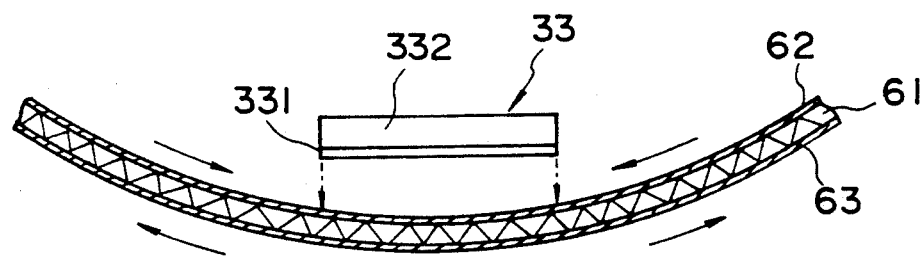
FIG. 5 is a sectional view showing the state where the door for the amenity receiving section is curved.
Figure 6:
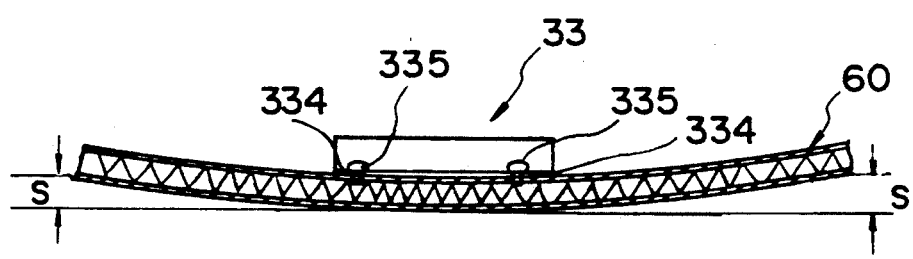
FIG. 6 is a sectional view of the open side of the door for the amenity receiving section.

A method for mounting the rigid rod 33 to the inner wall surface of the door for the receiving section 30 will be described with reference to FIGS. 4 to 6.

Figure 4:
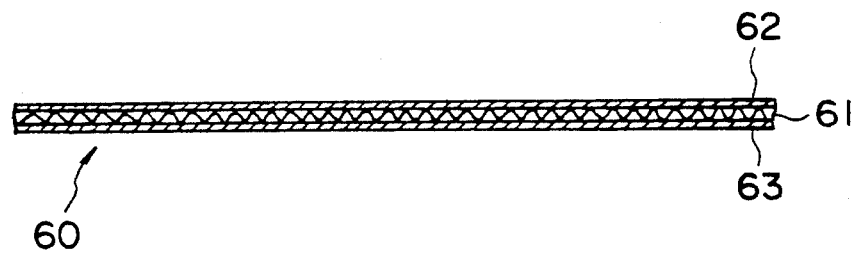
FIG. 4 is a sectional view of a honeycomb panel.

As shown in FIG. 4, a honey-comb panel 60 used as material for the lavatory unit 10 and doors 20 and 30 comprises a laminated plate obtained by adherring to both surface and back of a honey-comb core material 61 which is a honey-comb plate made of plastic fabrics such as glass fiber, alamide fiber, carbon fiber, etc. and sheet-like prepregs 62 and 63 in which single fiber is pregnated with phenol resin or epoxy resin. The honey-comb panel is an material which is light-weight and high in strength as is known. The door is a rectangular plate having a height of 180 cm. Particularly, the door for the receiving section 30 is a narrow lengthy plate having a width of about 30 cm and a member having a thickness of 12 mm, for example, is used.

The door for the receiving section 30 in the form of a narrow lengthy plate is applied with an external force lengthwise and then curved. The prepreg 62 side to form a curved recess is used as an inner surface of the door, and the prepreg 63 side to form a curved convex surface is used as an outer surface of the door. At this time, on the contrary, the prepreg 63 side to form the curved convex surface is in the state extended lengthwise. The lengthwise central portion of the door 30 forms the operating opening 32 and the door body comprises the narrow side portion 34. Therefore, the door 30 tends to be curved from the arrow width portion 34. The rigid rod 33 is arranged along the side edge of the operating opening 32 of the curved narrow width portion 34, and the rigid rod 33 is adherred by the adhesive to the surface of the prepreg 62 of the honey-comb panel 60. Furthermore, the fixing portions 334 on the both ends of the rigid rod 33 are fixed by the stop 335.

As just mentioned, the shrinkage side of the prepreg 62 is maintained in the shrinkage state by the rigid rod 33.

After the rigid rod 33 has been positively secured to the honey-comb panel 60 of the door 30 by the adhesive and the stop 335 or the like, the external force exerted to curve the honey-comb panel 60 is removed.

The honey-comb panel 60 tends to restore the state of a flat plate. However, in the narrow width portion 34 on the open side 30b of the door 30, the straight rigid rod 33 is secured to the door 30 in the curved state, and therefore, the inner wall surface on the open side 30b is pulled at its central portion by the rigid rod 33, and a lengthwisely slightly curved shape remains. The open side 30b of the door 30 is stablized in the state where both ends are wholly curved lengthwise to a degree as indicated at height S (see FIG. 6). It is desirable according to experiments that the height S is about 5 mm. On the other hand, when the external force used to provide a curvature is removed, the force is gone from the operating opening 32, and the mounting side 30a of the door 30 to the front wall 11 immediately restores to the state of a straight flat plate.

As described above, the door 30 is of a rectangular body in which the mounting side 30a is in the straight line and the open side 30b is in the curved shape. The open side 30b has a spring effect adjusted to the curved state. Here, the rigid rod 33 comprises a reinforcing member for the door plate of the narrow width portion 34 and has a function to maintain the curved shape of the door plate.

In the door for the receiving section 30 curved by mounting the rigid rod 33 to the inner wall surface as described above, the fixed surface of the rigid rod 33 is hinged to the receiving space side, and the side edge of the straight mounting side 30a hinged to the side edge of the opening 17 of the front wall 11.

Next, the closing state of the door for the receiving section 30 will be described with reference to FIGS. 7 and 8.

(1) The door for the receiving section 30 is turned, and the opening 17 of the front wall 11 is closed by the door 30. Since the side edge on the open side 30b of the door 30 is curved about the lengthwise central portion, i.e., the latch 31 mounting portion is in the state projected externally of the lavatory unit 10 (as indicated by symbol A in FIG. 7).

(2) Next, the door 30 is urged internally of the lavatory unit 10 so that the central portion of the door projected outwardly is placed in registration with the side edge of the opening 17. The hand is inserted into the operating opening 32 to slidably move the sliding rod 331 of the latch 31 secured internally of the door 30 and into engagement with a catch (not shown) provided on the side edge of the opening 17 of the front wall.

In this state, the opening side 30b of the door 30 is always urged in a direction of the space for the receiving section as indicated at arrow in FIG. 8 by the spring action caused by the curved shape, and positively maintained in the closed state.

The lavatory unit 10 according to the present invention will suffice to have a single latch to be mounted for both the door for the lavatory 20 and the door for the receiving section 30, and is simple in construction. Furthermore, particularly, the positive closure can be maintained for a long period of time by the provision of a single latch, and there occurs no inconvenience that a clearance is formed between the upper and lower ends of the door 30.

Moreover, since the lavatory unit and doors are constituted by the honey-comb panels, the light-weight and rigid unit results, which is easily handled and easily operated to form a curvature. In addition, since the open side of the door for receiving the amenities is curved, the curved central portion is latched whereby the urging force toward the inside of the receiving section acts on the upper and lower end portions of the door, and the whole door can be positively closed by placing a single latch to the narrow width plate-like door. Moreover, since the closure work of the door is terminated by placing a single latch thereon, an improvement in workability and energy saving are brought forth for an operator who has to terminate the exchange work of the amenities in a short period of time.

What is claimed is:

1. A lavatory unit for a passenger airplane having a front wall facing into a passenger compartment, said front wall being provided with an amenities opening for supply and removal of amenities from the passenger compartment, said amenities opening having a flexible amenities door hingedly mounted to said front wall along one edge of said amenities door adjacent one side of said amenities opening, a rigid rod secured to a middle portion of said amenities door adjacent to an edge thereof opposite to the hinged edge of said amenities door in a manner producing a lengthwise curvature of said door convexly in the direction of the passenger compartment along an unhinged edge of said amenities door, a door latch mounted on said amenities door and having an element thereof cooperating with a portion of the front wall adjacent said latch for securing and releasing said amenities door, whereby pressure exerted on said amenities door adjacent said latch depresses the convexly curved edge of said amenities door enabling said amenities door to be secured by means of the single latch.

2. A lavatory unit for a passenger airplane according to claim 1, wherein said amenities door for receiving the amenities is provided with an operating opening for operating said latch.

3. A lavatory unit for a passenger airplane according to claim 2, wherein said rigid rod is secured to said lengthwise curved door portion of said amenities door between said latch and said operating opening for said latch.

4. A lavatory unit for a passenger airplane according to claim 1, wherein internally of said opening for an amenity receiving section is arranged a box-like receiving portion opened outwardly of said lavatory unit, said box-like receiving section dividing the space within said lavatory unit into a lavatory space and a space for receiving said amenities.

5. A lavatory unit for a passenger airplane according to claim 2, wherein said latch for said amenities door is secured between said operating opening for operating said latch and the side edge on the unhinged side of said amenities door.

6. A lavatory unit for a passenger airplane according to claim 1, wherein said amenities door is formed from honey-comb panels with prepregs laminated on both surfaces of a honey-comb core.

7. A lavatory unit for a passenger airplane according to claim 6, wherein said amenities door is secured to a recessed wall surface of the prepreg in a shrunk state of said honey-comb panel with said rigid rod curved to thereby maintain said shrunk state of said prepreg.

8. A lavatory unit for a passenger airplane according to claims 2 or 5, wherein said rigid rod has a dimension of length longer than that of said latch operating opening.

* * * * *